(12) United States Patent
Kerr et al.

(10) Patent No.: US 11,842,346 B2
(45) Date of Patent: Dec. 12, 2023

(54) PAYMENTS FEDERATED DIRECTORY

(71) Applicant: Discover Financial Services, Riverwoods, IL (US)

(72) Inventors: Micah J. Kerr, Westerville, OH (US); Alexander Jay Nathan, Highland Park, IL (US); Julie Malikayil, Colorado Springs, CO (US); Michael D. Hansen, Houston, TX (US)

(73) Assignee: DISCOVER FINANCIAL SERVICES, Riverwoods, IL (US)

( * ) Notice: Subject to any disclaimer, the term of this patent is extended or adjusted under 35 U.S.C. 154(b) by 361 days.

(21) Appl. No.: 16/584,108

(22) Filed: Sep. 26, 2019

(65) Prior Publication Data

US 2021/0097533 A1   Apr. 1, 2021

(51) Int. Cl.
*G06Q 20/40* (2012.01)
*G06Q 20/38* (2012.01)
*G06Q 20/02* (2012.01)

(52) U.S. Cl.
CPC ......... *G06Q 20/4014* (2013.01); *G06Q 20/02* (2013.01); *G06Q 20/3821* (2013.01); *G06Q 20/40* (2013.01); *G06Q 20/401* (2013.01); *G06Q 2220/00* (2013.01)

(58) Field of Classification Search
CPC ............ G06Q 20/38–425; G06Q 20/02; G06F 21/604; G06F 21/6245
See application file for complete search history.

(56) References Cited

U.S. PATENT DOCUMENTS

| | | | | |
|---|---|---|---|---|
| 7,228,291 | B2 * | 6/2007 | Seamons | H04L 63/102 705/37 |
| 10,956,973 | B1 * | 3/2021 | Chang | G06Q 20/389 |
| 2003/0208684 | A1 * | 11/2003 | Camacho | G06Q 20/401 713/185 |
| 2007/0282743 | A1 * | 12/2007 | Lovelett | G06Q 20/102 705/40 |
| 2008/0059367 | A1 * | 3/2008 | Anuszewski | G06Q 40/00 705/39 |
| 2008/0120238 | A1 * | 5/2008 | Flitcroft | G06Q 20/04 705/44 |
| 2008/0222046 | A1 * | 9/2008 | McIsaac | G06Q 20/12 705/64 |
| 2010/0057578 | A1 * | 3/2010 | Blair | G06Q 40/02 705/16 |

(Continued)

FOREIGN PATENT DOCUMENTS

WO   WO-9919819 A1 *   4/1999   ........... G06Q 20/023

*Primary Examiner* — Jacob C. Coppola
(74) *Attorney, Agent, or Firm* — Lee Sullivan Shea & Smith LLP

(57) ABSTRACT

Embodiments provide a methods and systems for securely providing access to sensitive information for a plurality of entities. The method includes receiving, by a payer credential service provider (CSP), from a payer, a request for payee electronically protected information (EPI). The payer CSP transmits to a payee CSP a request for payee EPI data. The payee CSP validates, using a distributed ledger system, whether the payer has permission to request the payee EPI. The payer CSP receives the payee EPI data from the payee CSP. The payer CSP sends the payee EPI data to the payer.

16 Claims, 7 Drawing Sheets

(56) References Cited

U.S. PATENT DOCUMENTS

| | | | |
|---|---|---|---|
| 2011/0213707 A1* | 9/2011 | Jackson | G06Q 20/40 |
| | | | 707/769 |
| 2013/0290177 A1* | 10/2013 | Milam | G06Q 20/08 |
| | | | 705/40 |
| 2015/0379487 A1* | 12/2015 | Stewart | G06Q 30/04 |
| | | | 705/40 |
| 2017/0048216 A1* | 2/2017 | Chow | G06F 21/62 |
| 2017/0243209 A1* | 8/2017 | Johnsrud | G06Q 20/40 |
| 2018/0247302 A1* | 8/2018 | Armstrong | G06Q 20/3827 |
| 2018/0262335 A1* | 9/2018 | Bergner | G06Q 20/3825 |
| 2018/0276666 A1* | 9/2018 | Haldenby | G06Q 20/10 |
| 2019/0132138 A1* | 5/2019 | Finlow-Bates | H04L 67/1097 |
| 2019/0243986 A1* | 8/2019 | Uhr | G06F 21/6227 |
| 2020/0042992 A1* | 2/2020 | Zhang | G06Q 20/401 |
| 2020/0342394 A1* | 10/2020 | Moore | G06Q 20/389 |
| 2021/0014060 A1* | 1/2021 | Georgiadis | G06Q 20/3829 |
| 2021/0075623 A1* | 3/2021 | Petersen | H04L 9/50 |
| 2021/0365918 A1* | 11/2021 | Showalter | G06F 21/6245 |

* cited by examiner

PAYMENTS FEDERATED DIRECTORY

BACKGROUND OF THE INVENTION

Payers and payees, such as business payers and business payees conducting business to business (B2B) transactions, must exchange numerous types of sensitive data. For example, in some transactions, payers and payees must exchange tax information and bank account information.

Traditionally, payers and payees directly exchanged such information. This depending on the number of payees and payers an entity engages with, this can be burdensome and is error prone. Each time a new payer or payee is added or changes its information, the entity must carefully track the new information.

Alternatively, some business services may track the information using a centralized database containing all of the sensitive data. This is also error prone and relies on only one centralized business service. One existing model is a B2B payment network. These networks are proprietary, permissioned access directories. In order to access the list of payees, you must be part of the payment network. The vetting of payees varies from B2B payment network but is almost always stored in a centralized directory. Another existing model is the consortium wherein all payee data is stored in a centralized database and is closed access. B2B payment networks, including the consortium model, are permissioned for payers and payees.

B2B payments are difficult to efficiently maintain. Businesses struggle to gather the required payment information when onboarding vendors, to keep up-to-date records of payment information, and to ensure the proper remittance is included for cash application. When a payee updates their payment information, it is their duty to reach out to all points of contact to manually update their payment information. This inefficient process can lead to missed or delayed payments and leads to a lack of trust and secure access to business payment information.

BRIEF SUMMARY OF THE INVENTION

In one embodiment, the invention provides a method of securely providing access to sensitive information for a plurality of entities. The method includes receiving, by a payer credential service provider (CSP), from a payer, a request for payee electronically protected information (EPI). The payer CSP transmits to a payee CSP a request for payee EPI data. The payee CSP validates, using a distributed ledger system, whether the payer has permission to request the payee EPI. The payer CSP receives the payee EPI data from the payee CSP. The payer CSP sends the payee EPI data to the payer.

In another embodiment, a payer credential service provider (CSP) is provided. The CSP comprises a processor and a non-transitory computer readable memory storing instructions, that when executed by the processor, cause the CSP to perform a method. The method includes receiving, by a payer credential service provider (CSP), from a payer, a request for payee electronically protected information (EPI). The payer CSP transmits to a payee CSP a request for payee EPI data. The payee CSP validates, using a distributed ledger system, whether the payer has permission to request the payee EPI. The payer CSP receives the payee EPI data from the payee CSP. The payer CSP sends the payee EPI data to the payer.

In yet another embodiment, a non-transitory computer readable medium storing instructions, that when executed by a processor cause the processor to perform a method, is provided. The method includes receiving, by a payer credential service provider (CSP), from a payer, a request for payee electronically protected information (EPI). The payer CSP transmits to a payee CSP a request for payee EPI data. The payee CSP validates, using a distributed ledger system, whether the payer has permission to request the payee EPI. The payer CSP receives the payee EPI data from the payee CSP. The payer CSP sends the payee EPI data to the payer.

DETAILED DESCRIPTION OF THE INVENTION

Embodiments of the invention provide a distributed ledger system, such as a blockchain-based solution, for a distributed directory of trusted and/or verified partners within the commercial payments ecosystem. In one embodiment, business entities can store and share corporate payment and remittance information in a permissioned manner through the directory. Embodiments allow the directory allows businesses to add, maintain, and control access to their payment information through a federated system. Further, the directory allows businesses to search, retrieve, and subscribe to other businesses' payment information thus simplifying complex onboarding processes.

The distributed ledger system uses blockchain technology to enable privacy and confidentiality on permissioned networks. Previous solutions required high administrative time without providing a high level of robustness and confidentiality.

The distributed ledger system includes the hashing of payment data. Rather than using a centralized database containing all of the sensitive data, a distributed ledger, such as blockchain, is utilized to store public information about a company and a hash (a secure, one-way reference) of any sensitive data. Credential Service Providers (CSPs), operate as a trusted entity and are responsible for storing the sensitive data off-chain. The CSPs may perform full due diligence on the information including bank account information for any payees.

The directory provides the ability for payers to have full control over entities that can access their payment data through a permission-controlled system validated by the participating CSPs. These elements and processes create a more efficient platform for CSPs, payers, and payees to interact and conduct business. According to an embodiment, the business payments federated directory (BPFD) distributed ledger is proprietary and permissioned for the Credential Service Providers.

Figure 1:
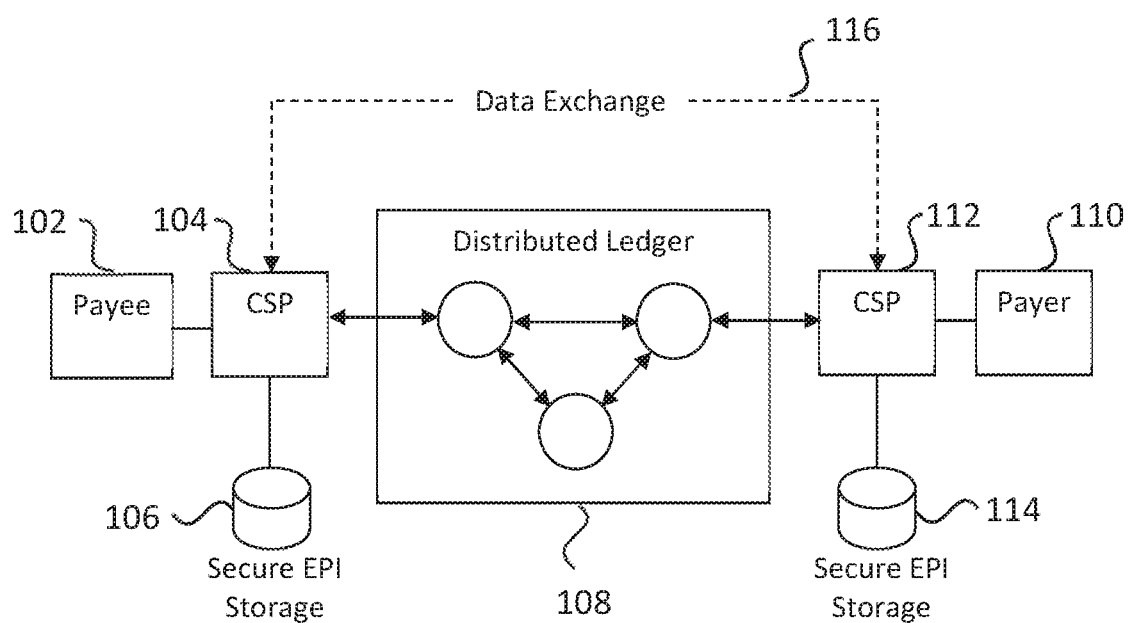
FIG. 1 provides a system for the exchange of sensitive information according to an embodiment.

FIG. 1 provides a system for the exchange of sensitive information according to an embodiment of a business payments federated directory. In the illustrated embodiment, payee 102 and payer 110 need to exchange information. For example, payee 102 and payer 110 may be conducting business to business (B2B) transactions and payer 110 may need access to payee 102 sensitive information, such as tax information and bank account information. Information such as tax information and bank account information may be required in order to complete a B2B transaction.

In the illustrated embodiment, payee 102 uses a credential service provider (CSP) 104 to facilitate the exchange of sensitive information. The CSP 104 places certain information, such as the name of the payee 102 into the distributed ledger 108. Sensitive information, such as the payee 102 tax information and bank account information are stored by the CSP 104 in secure electronically protected information (EPI) datastore 106. A hash of the EPI is then stored on the distributed ledger 108.

Payer 110 also uses a credential service provider 112. While the illustrated embodiment shows two credential service providers, payee 102 and payer 110 may also use the same CSP. In a system with many payee and payers, there would by various CSPs. Some payees and payers may use the same CSP while other payees and payers use different CSPs. Each CSP may be a node in the distributed ledger 108.

The CSP 112 places certain information, such as the name of the payer 110 into the distributed ledger 108. In an embodiment, sensitive information, such as the payer 110 tax information and bank account information, if provided, are stored by the CSP 112 in secure electronically protected information (EPI) datastore 114. Depending on the transaction, payer 110 may become a payee. Conversely, payee 102 may become a payer depending on the transaction.

As described in more detail below, payer 110 can request sensitive information about payee 102. The request is made through CSP 112. CSP 112 provides basic information as needed from the distributed ledger 108. The CSP 112 also requests sensitive information from the CSP 104. CSP 112 verifies that payer 110 has permission to access the sensitive information by validating access using a permissions access list stored in the distributed ledger 108. If the payer 110 has permission, CSP 104 obtains the sensitive information from datastore 106 and transmits the sensitive information over a secure communication channel 116. The secure communication channel 116 may be a public network and the sensitive information may be encrypted to send over the communication channel 116. CSP 112 receives the sensitive information, verifies the data validity against the hash from the distributed ledger 108, and transmits all required information to payer 110.

Figure 2:
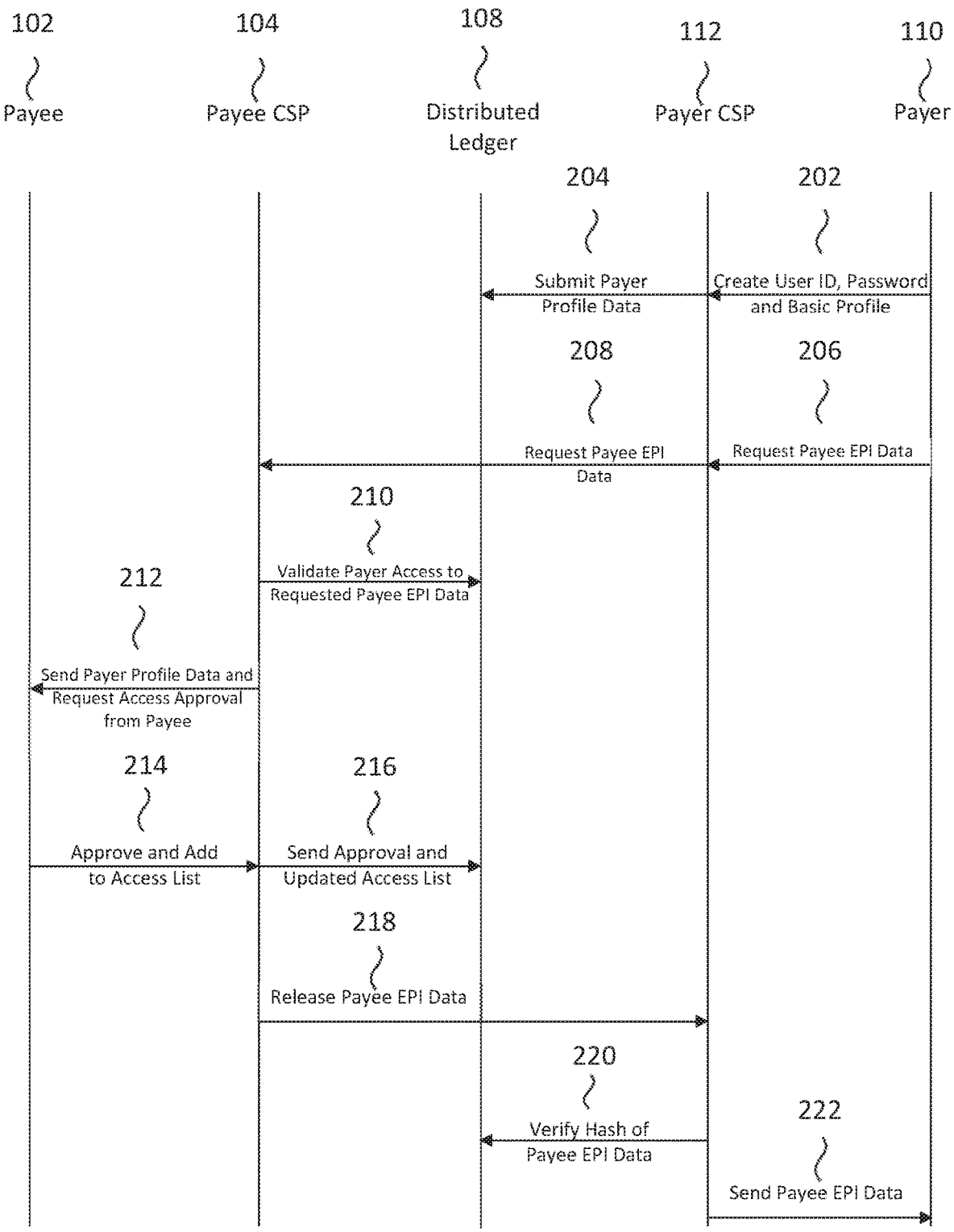
FIG. 2 provides a sequence diagram for exchanging sensitive payment information according to an embodiment.

FIG. 2 provides a sequence diagram for exchanging sensitive payment information according to an embodiment. In the illustrated embodiment, payer 110 creates an account in the business payments federated directory. For example, at 202 the payer 110 sends the payer CSP 112 information to establish an account, such as user ID, password, and basic profile information. At 204, the payer CSP 112 submits the payer 110 profile data to the distributed ledger system 108. Additionally, as described above, the payer 110 may submit sensitive information to the CSP 112 for storage in the datastore 114 (FIG. 1).

After establishing an account, the payer 110 can then request payee 102 electronically protected information (EPI) at step 206. The request is made from the payer 110 to the payer CSP 112. At 208, the payer CSP 112 submits the request to CSP 104 over the secure communication channel 116. For example, the CSP may be a node in the distributed ledger 108. A CSP can also access the distributed ledger 108 through another CSP that is acting as a master node that provides access to other CSPs.

At 210, payee CSP 104 verifies that the payer 110 has permission to access the payee 102 electronically protected information (EPI) using the distributed ledger 108. If it is determined that access is needed, at 212, the payee CSP 104 sends the payer 110 profile data and a request for access approval to the payee 102. At 214, the payee either approves or does not approve the request for access. In the illustrated embodiment, at 214, the request is approved and permission to add the payer 110 to an approved access list is provided to the payee CSP 104. At 216, the payee CSP 104 sends approval and updates the access list in the distributed ledger 108. At 218 the payee EPI data is sent to the payer CSP 112 over the secure communication channel 116 (FIG. 1). The payer CSP 112 then verifies the validity of the EPI data at 220. In the illustrated embodiment, at 222, the EPI data is validated and payer CSP 112 sends the payee EPI data to the payer 110.

Figure 3:
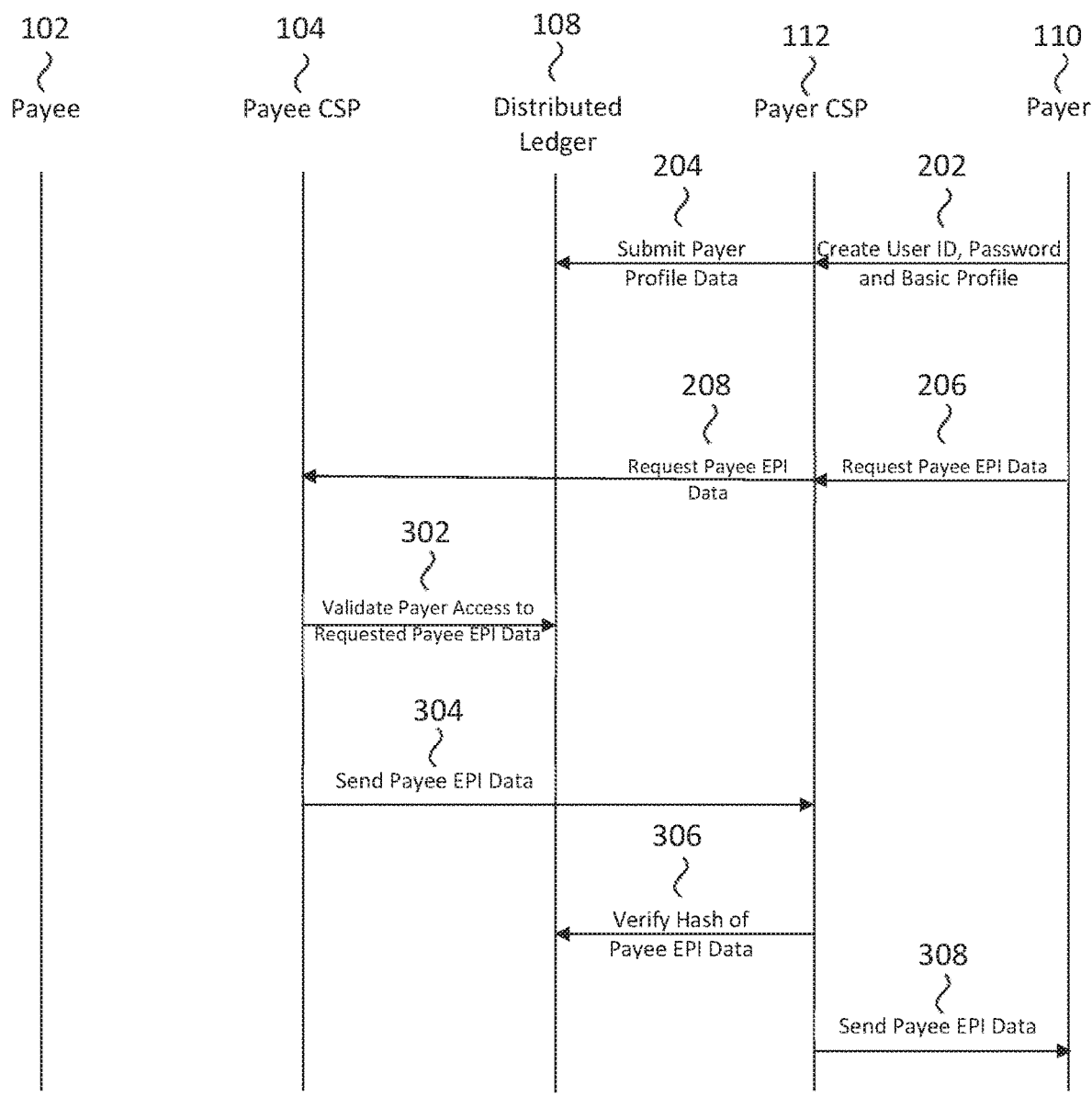
FIG. 3 provides a sequence diagram for exchanging sensitive payment information according to an embodiment.

FIG. 3 provides a sequence diagram for exchanging sensitive payment information according to an embodiment. Similar to the embodiment described with respect to FIG. 2, payer 110 creates an account in the business payments federated directory. For example, at 202 the payer 110 sends the payer CSP 112 information to establish an account, such as user ID, password, and basic profile information. At 204, the payer CSP 112 submits the payer 110 profile data to the distributed ledger system 108. Additionally, as described above, the payer 110 may submit sensitive information to the CSP 112 for storage in the datastore 114 (FIG. 1). If the payer 110 already has an account, then steps 202 and 204 are not needed.

As described above, after establishing an account, the payer 110 can then request payee 102 electronically protected information (EPI) at step 206. The request is made from the payer 110 to the payer CSP 112. At 208, the payer CSP 112 submits the request to CSP 104 over the secure communication channel 116 (FIG. 1). For example, the CSP may be a node in the distributed ledger 108. A CSP can also access the distributed ledger 108 through another CSP that is acting as a master node that provides access to other CSPs.

At 302, CSP 104 verifies that the payer 110 has permission to access the payee 102 electronically protected information (EPI) using the distributed ledger 108. If it is determined that access is allowed, at 304, the payee CSP 104 sends the payee 102 EPI data to the payer CSP 112 over the secure communication channel 116 (FIG. 1). The payer CSP 112 then verifies the validity of the EPI data at 306. In the illustrated embodiment, at 308, the EPI data is validated and payer CSP 112 then provides the payee 102 EPI data to the payer 110.

Figure 4:
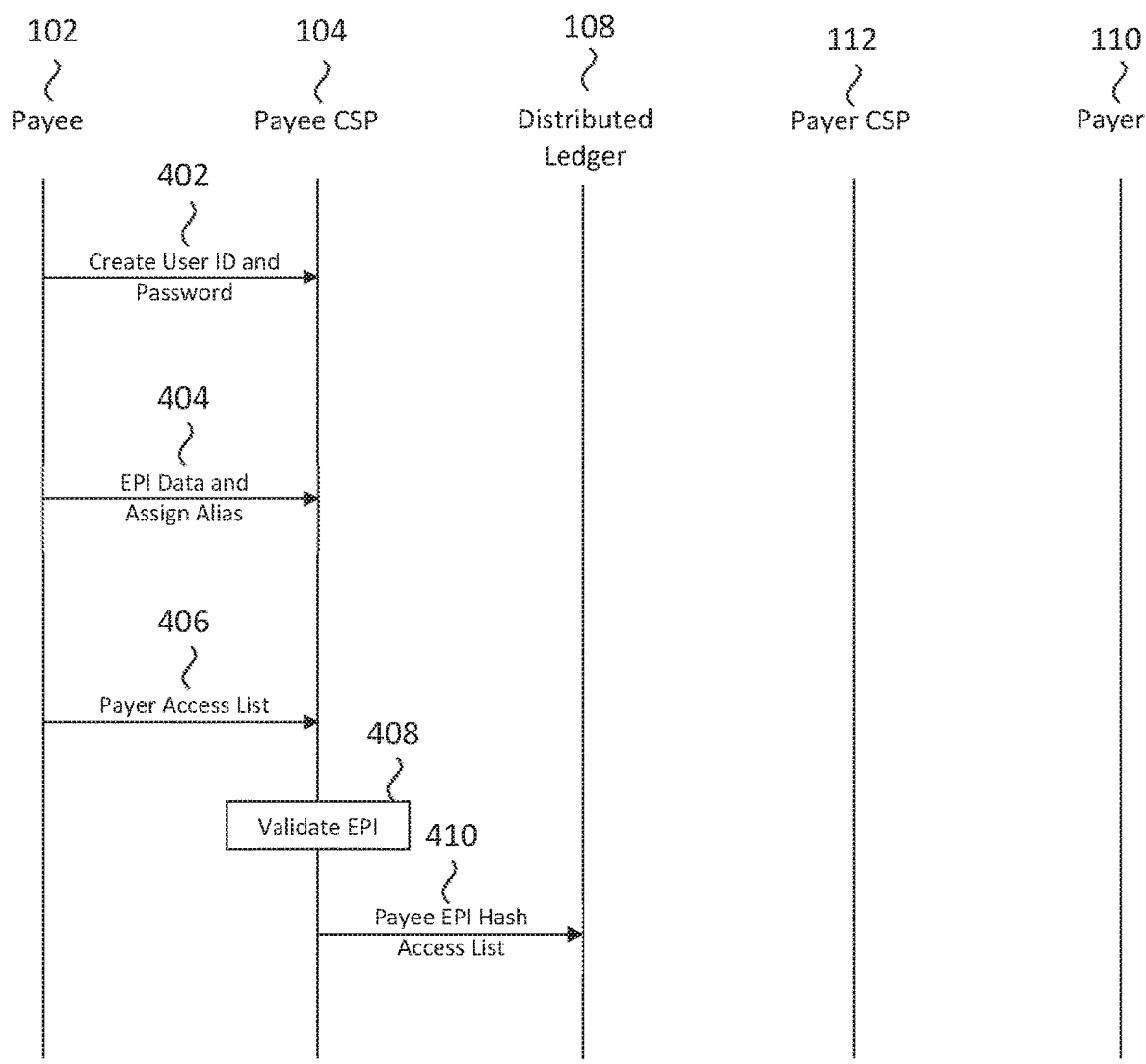
FIG. 4 provides a sequence diagram for providing access to sensitive payment information according to an embodiment.

FIG. 4 provides a sequence diagram for providing access to sensitive payment information according to an embodiment. In this embodiment, payee 102 establishes a new account in the federated directory. At 402, the payee 102 sends the payer CSP 104 information to establish an account, such as user ID, password, and basic profile information. At 404, the payee 102, send EPI data to the payee CSP 104, and may assign an alias. At 406, the payee 102 sends a payer access list to the payee CSP 104. In some embodiments, individual payers that the payee 102 wants to provide access to are sent to the CSP 104. The CSP 104 can then create or modify an access list for the payee 102. At 408, the payee CSP 104 validates the EPI data provided by the payee 102. The payee CSP 104 then saves a hash of the payee 102 EPI data to the distributed ledger 108 at 410. In some embodiments, the payee CSP 104 also saves the access list in the distributed ledger 108.

Figure 5:
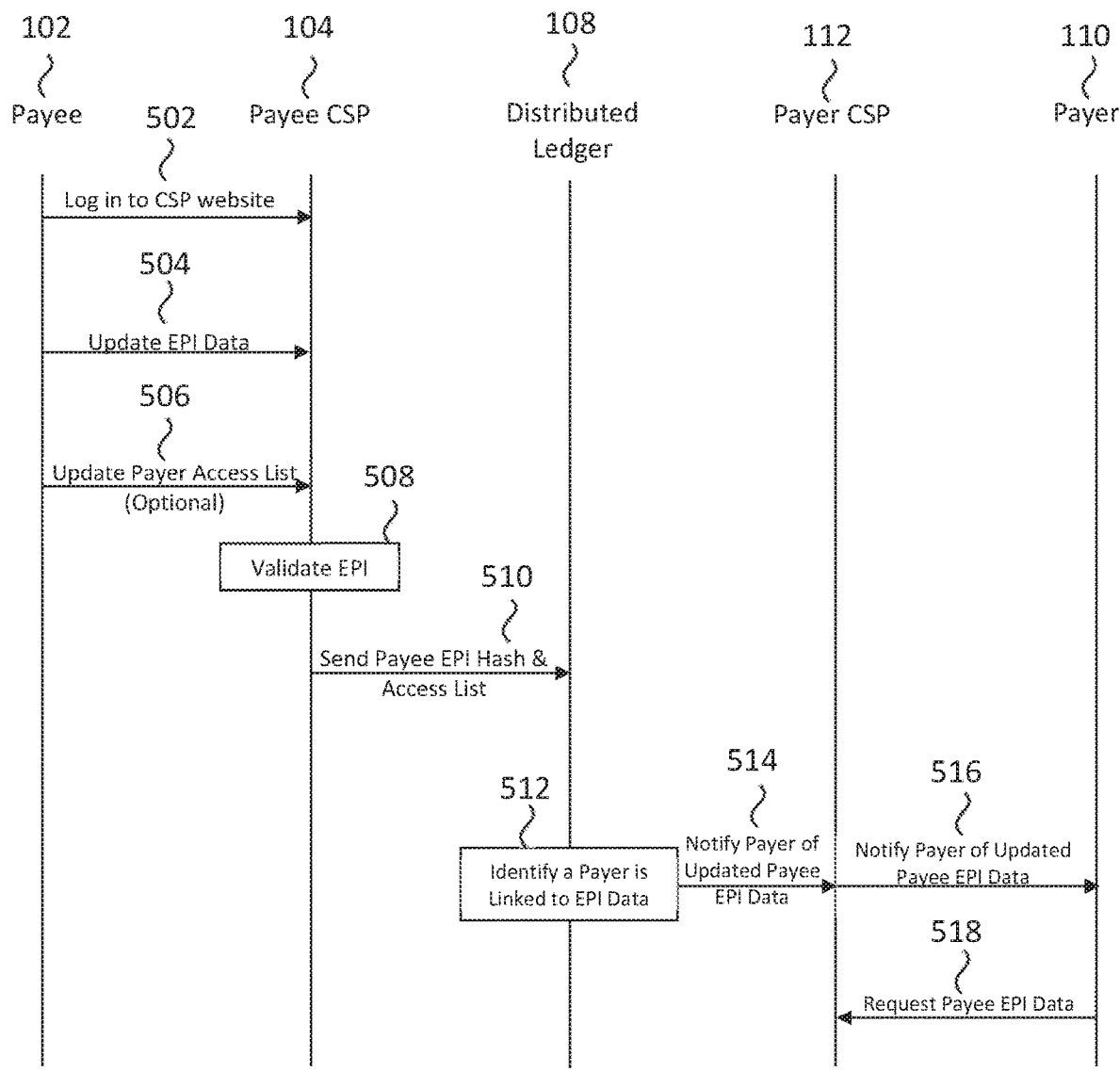
FIG. 5 provides a sequence diagram for providing access to sensitive payment information according to an embodiment.

FIG. 5 provides a sequence diagram for providing access to sensitive payment information according to an embodiment. For example, a payee may provide access to updated EPI data. At 502, the payee 102 accesses the payee CSP 104. In one embodiment, the payee 102 may access the payee CSP 104 by logging into a CSP website or other communication modalities. At 504, the payee 102 provides updated EPI data to the payee CSP 104. At 506, the payee may also update its payer access list, as described above. Payers can be added or removed from the access list. This step is only necessary if there are updates to be made to the payer access list.

At 508, the payee CSP 104 validates the EPI data provided by the payee 102. At 510, the payee CSP 104 stores a hash of the payee EPI data and the access list, if it has been updated, in the distributed ledger 108. A payer 110 linked to the updated EPI data is identified. This can be done, for example, identifying each payer on a payee's access list. The identification can be done by the payer CSP 112 when it receives updated information from the distributed ledger 112 at step 514. At step 516 the payer CSP 112 notifies the payer 110 of the updated payee 102 EPI data. At 518, the payer 110 can then request the updated payee EPI data from the payer CSP 112.

Figure 6:
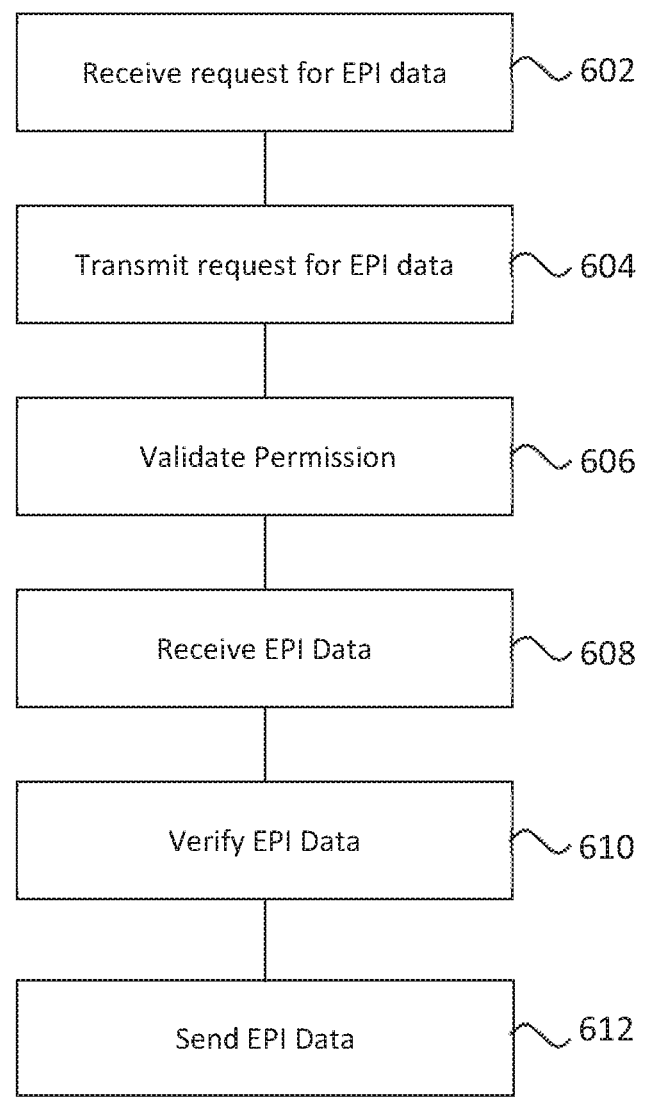
FIG. 6 is a flow diagram for providing sensitive payment information according to an embodiment.

FIG. 6 is a flow diagram for providing sensitive payment information according to an embodiment. The diagram illustrates a method of securely providing access to sensitive information for a plurality of entities. At step 602, a payer credential service provider (CSP) receives a request from a payer, for payee electronically protected information (EPI). At step 604, the payer CSP transmits to a payee CSP, a request for payee EPI. The payee CSP validates, using a distributed ledger system, whether the payer has permission to request the payee EPI at step 606. If the payer has permission to receive the EPI data, then at step 608, the payer CSP receives payee EPI data from the payee CSP. At step 610, the payer CSP verifies the EPI data against the hash stored on the distributed ledger then sends the payee EPI data to the payer in step 612. After receiving the payee EPI data, the payer 110 can then make a payment to the payee 102. Payment can be made using information in the EPI data. The payment can be made through traditional payment channels or can be made through the distributed ledger system 108.

Figure 7:
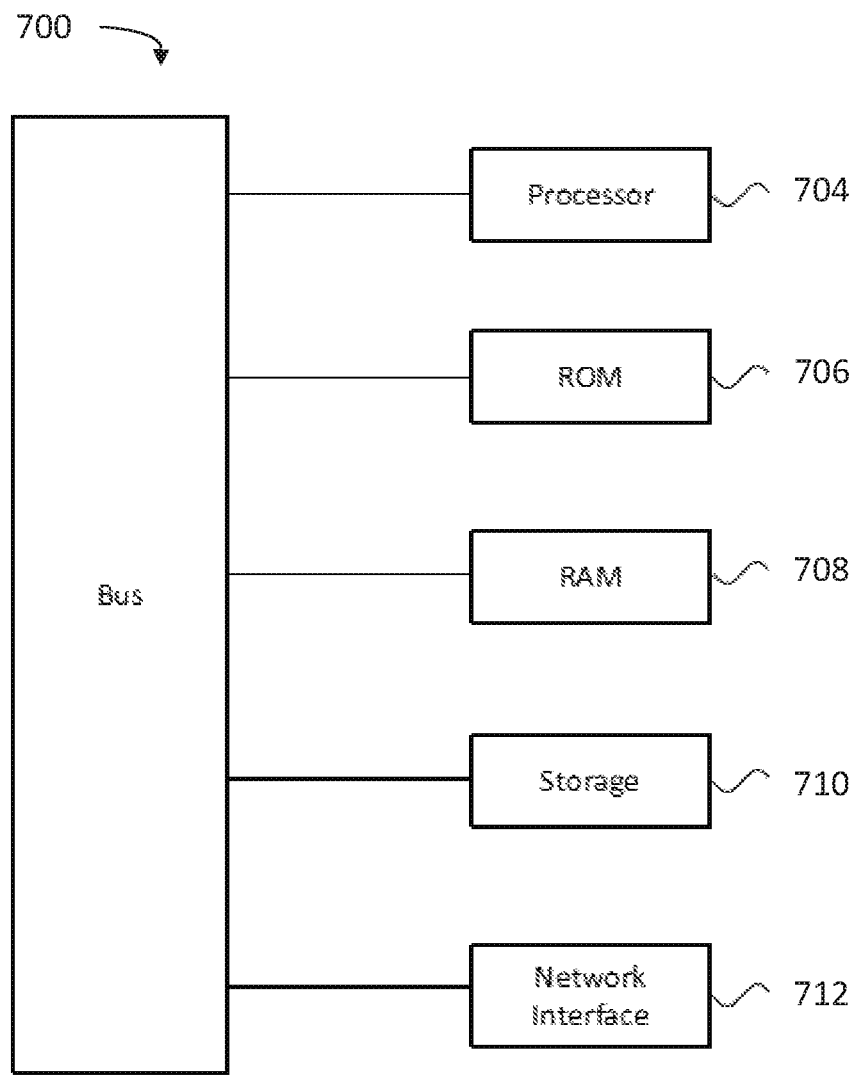
FIG. 7 is block diagram of a processing system according to an embodiment.

FIG. 7 is block diagram of a processing system according to an embodiment. The processing system includes a processor 704, such as a central processing unit (CPU), executes computer executable instructions comprising embodiments of the system for performing the functions and methods described above. In embodiments, the computer executable instructions are locally stored and accessed from a non-transitory computer readable medium, such as storage 710, which may be a hard drive or flash drive. Read Only Memory (ROM) 706 includes computer executable instructions for initializing the processor 704, while the random-access memory (RAM) 708 is the main memory for loading and processing instructions executed by the processor 704. The network interface 712 may connect to a wired network or cellular network and to a local area network or wide area network, such as the internet.

The processing device of FIG. 7 can be used to implement the methods and systems described above. For example, each CSP may comprise one or more processing systems. Similarly, each payer and payee may have one or more processing systems to interface with the CSP systems and carry out the described methods. Each node in the blockchain can also comprise one or more processing systems.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method carried out by a payer credential service provider (CSP) that is associated with a given payer of business-to-business (B2B) transactions and is configured to operate as a first node of a distributed ledger, wherein a payee CSP associated with a given payee of the B2B transactions is configured to operate as a second node of the distributed ledger, the method comprising:

receiving, by the payer CSP from the given payer, a first request for payee electronically protected information (EPI) of the given payee that enables submission of payments to the given payee, wherein (i) the payee EPI of the given payee is stored by the payee CSP off of the distributed ledger and (ii) a hash of the payee EPI is stored by the payee CSP on the distributed ledger such that it is accessible by the payer CSP;

transmitting, from the payer CSP to the payee CSP over a secure communication channel between the payer CSP and the payee CSP, a second request for the payee EPI of the given payee;

after sending the second request to the payee CSP over the secure communication channel, receiving, by the payer CSP from the payee CSP over the secure communication channel, the payee EPI for the given payee, wherein the received payee EPI comprises at least one of tax information or bank account information of the given payee;

validating, by the payer CSP using the distributed ledger, that the received payee EPI of the given payee is accurate by verifying the received payee EPI against the hash of the payee EPI of the given payee that was previously stored on the distributed ledger by the payee CSP;

sending, by the payer CSP to a computing system associated with the given payer, the received payee EPI for the given payee, wherein the payee EPI is thereafter used by the given payer to submit payment to the given payee for B2B transactions;

detecting, by the payer CSP through the distributed ledger, an indication that the payee EPI of the given payee has been updated; and notifying the payer that the payee EPI of the given payee has been updated.

2. The method of claim 1 further comprising:

receiving, by the payer CSP from the given payer, a request to create a user identification, password, and profile data for the given payer; and storing the payer profile data on the distributed ledger.

3. The method of claim 1 wherein the payee EPI of the given payee that is stored by the payee CSP off of the distributed ledger comprises payee EPI of the given payee that is at least partially stored in a secure database at the payee CSP.

4. The method of claim 1 wherein an access list for payee EPI of the given payee is stored in the distributed ledger.

5. The method of claim 1 wherein the distributed ledger is a blockchain system.

6. A payer credential service provider (CSP) that is associated with a given payer of business-to-business (B2B) transactions and is configured to operate as a first node of a distributed ledger, wherein a payee CSP associated with a given payee of the B2B transactions is configured to operate as a second node of the distributed ledger, the payer CSP comprising:

a network interface;

a processor; and a non-transitory computer readable memory storing executable instructions that, when executed by the processor, cause the CSP to perform functions comprising:

receiving, from the given payer, a first request for payee electronically protected information (EPI) of the given payee that enables submission of payments to the given payee, wherein (i) the payee EPI of the given payee is stored by the payee CSP off of the distributed ledger and (ii) a hash of the payee EPI is stored by the payee CSP on the distributed ledger such that it is accessible by the payer CSP;

transmitting, to the payee CSP over a secure communication channel between the payer CSP and the payee CSP, a second request for the payee EPI of the given payee;

after sending the second request to the payee CSP over the secure communication channel, receiving, from the payee CSP over the secure communication channel, the payee EPI for the given payee, wherein the received payee EPI comprises at least one of tax information or bank account information of the given payee;

validating, using the distributed ledger, that the received payee EPI of the given payee is accurate by verifying the received payee EPI against the hash of the payee EPI of the given payee that was previously stored on the distributed ledger by the payee CSP;

sending, to a computing system associated with the given payer, the received payee EPI for the given payee, wherein the payee EPI is thereafter used by the given payer to submit payment to the given payee for B2B transaction;

detecting, by the payer CSP through the distributed ledger, an indication that the payee EPI of the given payee has been updated; and notifying the payer that the payee EPI of the given payee has been updated.

7. The payer CSP of claim 6 wherein the stored executable instructions, when executed by the processor, further cause the payer CSP to perform functions comprising:

receiving, from the given payer, a request to create a user identification, password, and profile data for the given payer; and storing the payer profile data on the distributed ledger.

8. The payer CSP of claim 6 wherein the payee EPI of the given payee that is stored by the payee CSP off of the distributed ledger comprises payee EPI of the given payee that is at least partially stored in a secure database at the payee CSP.

9. The payer CSP of claim 6 wherein an access list for payee EPI of the given payee is stored in the distributed ledger.

10. The payer CSP of claim 6 wherein the distributed ledger is a blockchain system.

11. A non-transitory computer readable medium storing executable instructions for a payer credential service provider (CSP) that is associated with a given payer of business-to-business (B2B) transactions and is configured to operate as a first node of a distributed ledger, wherein a payee CSP associated with a given payee of the B2B transactions is configured to operate as a second node of the distributed ledger, and wherein the executable instructions, when executed by a processor of the payer CSP, cause the payer CSP to perform functions comprising:

receiving, from the given payer, a first request for payee electronically protected information (EPI) of the given payee that enables submission of payments to the given payee, wherein (i) the payee EPI of the given payee is stored by the payee CSP off of the distributed ledger and (ii) a hash of the payee EPI is stored by the payee CSP on the distributed ledger such that it is accessible by the payer CSP;

transmitting, to the payee CSP over a secure communication channel between the payer CSP and the payee CSP, a second request for the payee EPI of the given payee;

after sending the second request to the payee CSP over the secure communication channel, receiving, from the payee CSP over the secure communication channel, the payee EPI for the given payee, wherein the received payee EPI comprises at least one of tax information or bank account information of the given payee;

validating, using the distributed ledger, that the received payee EPI of the given payee is accurate by verifying the received payee EPI against the hash of the payee EPI of the given payee that was previously stored on the distributed ledger by the payee CSP;

sending, to a computing system associated with the given payer, the received payee EPI for the given payee, wherein the payee EPI is thereafter used by the given payer to submit payment to the given payee for B2B transactions;

detecting, by the payer CSP through the distributed ledger, an indication that the payee EPI of the given payee has been updated; and notifying the payer that the payee EPI of the given payee has been updated.

12. The non-transitory computer readable medium of claim 11 wherein the stored executable instructions, when executed by the processor, further cause the payer CSP to perform functions comprising:

receiving, from the given payer, a request to create a user identification, password, and profile data for the given payer; and storing the payer profile data on the distributed ledger.

13. The non-transitory computer readable medium of claim 11 wherein the payee EPI of the given payee that is stored by the payee CSP off of the distributed ledger comprises payee EPI of the given payee that is at least partially stored in a secure database at the payee CSP.

14. The non-transitory computer readable medium of claim 11 wherein an access list for payee EPI of the given payee is stored in the distributed ledger.

15. The non-transitory computer readable medium of claim 11 wherein the distributed ledger is a blockchain system.

16. A system comprising:
a distributed ledger;
a payer credential service provider (CSP) that is associated with a given payer of business-to-business (B2B) transactions and is configured to operate as a first node of the distributed ledger; and
a payee CSP that is associated with a given payee of the B2B transactions and is configured to operate as a second node of the distributed ledger;

wherein the payee CSP is configured to:

store payee electronically protected information (EPI) of the given payee that enables submission of payments to the given payee off of the distributed ledger;

store a hash of the payee EPI on the distributed ledger such that it is accessible by the payer CSP;

receive from the payer CSP, over a secure communication channel between the payer CSP and the payee CSP, a request for the payee EPI of the given payee; and after receiving the request for the payee EPI of the given payee, transmit to the payer CSP, over the secure communication channel, the payee EPI of the given payee, wherein the transmitted payee EPI comprises at least one of tax information or bank account information of the given payee; and wherein the payer CSP is configured to:

transmit to the payee CSP, over the secure communication channel between the payer CSP and the payee CSP, the request for the payee EPI of the given payee;

receive from the payee CSP, over the secure communication channel, the payee EPI for the given payee, wherein the received payee EPI comprises the at least one of the tax information or the bank account information of the given payee;

verify the received payee EPI against the hash of the payee EPI of the given payee that was previously stored on the distributed ledger by the payee CSP;

send, to a computing system associated with the given payer, the received payee EPI for the given payee, wherein the payee EPI is thereafter used by the given payer to submit payment to the given payee for B2B transactions;

detect, through the distributed ledger, an indication that the payee EPI of the given payee has been updated; and notify the payer that the payee EPI of the given payee has been updated.

* * * * *